(12) United States Patent
Barrett

(10) Patent No.: US 9,702,368 B1
(45) Date of Patent: Jul. 11, 2017

(54) FLEXIBLE BLADE CONFIGURATION FOR EFFICIENTLY MOVING FLUID USING A WAVING MOTION

(71) Applicant: Kenneth Charles Barrett, Bristol, PA (US)

(72) Inventor: Kenneth Charles Barrett, Bristol, PA (US)

( * ) Notice: Subject to any disclaimer, the term of this patent is extended or adjusted under 35 U.S.C. 154(b) by 427 days.

(21) Appl. No.: 14/449,131

(22) Filed: Jul. 31, 2014

(51) Int. Cl.
| | |
|---|---|
| A45B 27/00 | (2006.01) |
| F04D 25/08 | (2006.01) |
| F04D 29/02 | (2006.01) |
| F03D 3/06 | (2006.01) |
| F03D 3/00 | (2006.01) |

(52) U.S. Cl.
CPC ............ *F04D 25/086* (2013.01); *A45B 27/00* (2013.01); *F03D 3/005* (2013.01); *F03D 3/061* (2013.01); *F03D 3/062* (2013.01); *F03D 3/068* (2013.01); *F04D 29/02* (2013.01)

(58) Field of Classification Search
CPC ....... F04D 25/086; F04D 29/02; A45B 27/00; F05B 2240/311
USPC ...... 416/70 A, 71–73, 240, 132 A, 110, 111, 416/117, 119
See application file for complete search history.

(56) References Cited

U.S. PATENT DOCUMENTS

| 359,374 | A | | 3/1887 | Wright | |
|---|---|---|---|---|---|
| 1,388,037 | A | * | 8/1921 | Hasskarl | A45B 27/00 |
| | | | | | 416/70 A |
| 2,392,671 | A | * | 1/1946 | Husted | A45B 27/00 |
| | | | | | 351/158 |
| 5,181,678 | A | * | 1/1993 | Widnall | B64C 3/48 |
| | | | | | 114/127 |
| 5,993,158 | A | * | 11/1999 | Young | A47J 43/1068 |
| | | | | | 416/132 A |
| 7,601,041 | B2 | | 10/2009 | McCarthy | |
| 9,175,702 | B1 | * | 11/2015 | Bailey | F15D 1/00 |
| 2006/0145483 | A1 | * | 7/2006 | Larsen | F03D 7/022 |
| | | | | | 290/44 |
| 2013/0091861 | A1 | * | 4/2013 | Groot | F03D 3/005 |
| | | | | | 60/784 |
| 2014/0356168 | A1 | * | 12/2014 | Cocks | F01D 5/141 |
| | | | | | 416/132 A |

* cited by examiner

*Primary Examiner* — Kenneth Bomberg
*Assistant Examiner* — Behnoush Haghighian
(74) *Attorney, Agent, or Firm* — LaMorte & Associates, P.C.

(57) ABSTRACT

A blade configuration for efficiently moving a fluid using a waving action. The blade configuration uses a flexible panel. A pocket depression is formed in the flexible panel. The pocket depression is closer to a rear edge than to a front edge. Consequently, the flexible panel has a first average slope from its front edge to the pocket depression and a second average slope from its rear edge to the pocket depression. The second average slope is greater than the first average slope. Due to the shape of the pocket depression and attachment to the framework, waving movement of the blade through the fluid causes vortices to be generated and shed in a manner causing the fluid which interacts with the flexible panel to flow mostly in the direction of the front edge of the flexible panel. This directs much of the displaced fluid out the front edge.

16 Claims, 6 Drawing Sheets

FLEXIBLE BLADE CONFIGURATION FOR EFFICIENTLY MOVING FLUID USING A WAVING MOTION

BACKGROUND OF THE INVENTION

1. Field of the Invention

In general, the present invention relates to the structures of blades that move in a waving pattern for moving fluids such as air or water. More particularly, the present invention relates to blades that have airfoils or hydrofoils that include at least one section that becomes deformed by the fluid being moved.

2. Prior Art Description

Hand fans and similar waving fans have been in existence since the dawn of human history. Waving fans are traditionally a piece of flat material that is waved back and forth to displace air and cause movement in the air. The flat piece of material is typically a piece of paperboard or a piece of fabric supported by a frame. When waved through the air, the material acts as a fan blade and moves the air to cause a slight wind.

Although traditional waving fans are simple, they are not highly efficient at moving air. When traditional waving fans are moved through the air, the fans displace the air in a variety of directions. Only a portion of the air displaced by the fan moves in the direction desired. Most of the air is moved in a direction of little benefit to the person waving the fan.

In the art of airfoil design and hydrofoil design for waving blades, there have been numerous design improvements that were intended to improve the efficiency of waving blades. Many of these prior art improvements involve using a flexible material in the foil structure that can catch and displace more air or water. Such prior art blade configurations are exemplified by U.S. Pat. No. 359,374 to Wright and the large family of patents owned by Peter T. McCarthy as exemplified by U.S. Pat. No. 7,601,041.

In such prior art designs, waving blades are provided that contain areas of flexible material. As the blade waves through a fluid, the flexible material stretches to hold and displace more of the fluid. However, the displacement of the fluid is not directed in any one particular direction. The fluid is evenly displaced around the periphery of the blade. As a result, more power is needed to move the blade through the fluid. The net efficiency of the blade configuration remains relatively constant. The blade merely becomes more effective because it moves more air or water. However, the blade configuration does not become more efficient. Much of the fluid that is displaced by the blade is displaced in directions and vertices that serve no useful purpose in propulsion. Consequently, although prior art blades with flexible sections are powerful, they require a greater amount of power to wave. The net efficiency does not change significantly.

A need therefore exists for a blade configuration that efficiently directs that material away from the blade in a useful controlled direction while catching more air or water. This need is met by the present invention as described and claimed below.

SUMMARY OF THE INVENTION

The present invention is a blade configuration for efficiently moving a fluid in a specific direction using a waving action. The blade configuration uses a flexible panel that is impervious to the fluid being moved. The flexible panel has a periphery that includes a front edge, a rear edge and two side edges. A pocket depression is formed in the flexible panel. The majority of the pocket depression is closer to the rear edge of the flexible panel than to the front edge.

A framework supports at least parts of the periphery of the flexible panel in a common plane. The pocket depression protrudes out of said common plane and is invertible. As such, the pocket depression can extend away from either side of the common plane.

Due to the position of the pocket depression within the flexible panel, the flexible panel has a first average slope from its front edge to the pocket depression and a second average slope from its rear edge to the pocket depression. The second average slope is greater than the first average slope. As a result, when the blade configuration is waved in a fluid, the fluid is displaced. Due to the shape of the pocket depression and attachment to the framework, waving movement of the blade through the fluid causes vortices to be generated and shed. With this pocket depression orientation, a reverse Kármán vortex street is generated, as commonly observed in fish-like locomotion or flapping wing flight. This causes the fluid to interact with the flexible panel in the direction of the front edge of the flexible panel. Since the displaced fluid is better controlled and directed into a specific vector, the blade configuration is more efficient in moving fluid in a specified direction. This produces a more efficient waving fan or propulsion system.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention blade configuration can be used in many ways, only a few embodiments of applications are illustrated. The embodiments selected set forth some of the best modes contemplated for the invention. The illustrated embodiments, however, are merely exemplary and should not be considered limitations when interpreting the scope of the appended claims.

Figure 1:
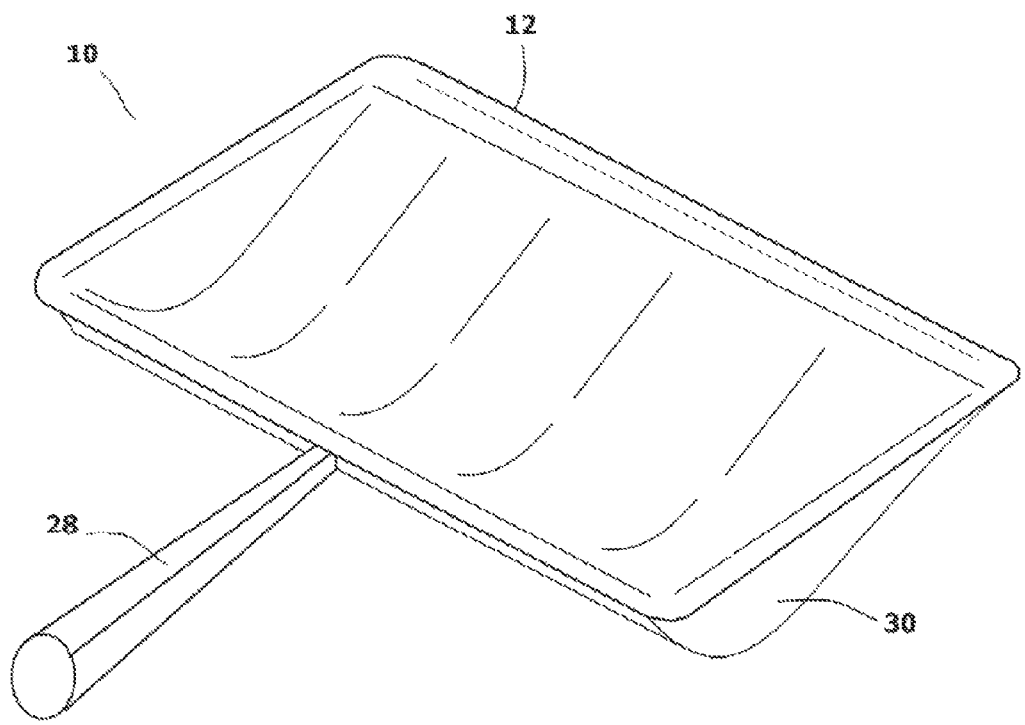
FIG. 1 is a perspective view of an exemplary embodiment of a fan containing a blade configuration in accordance with the present invention.
Figure 2:
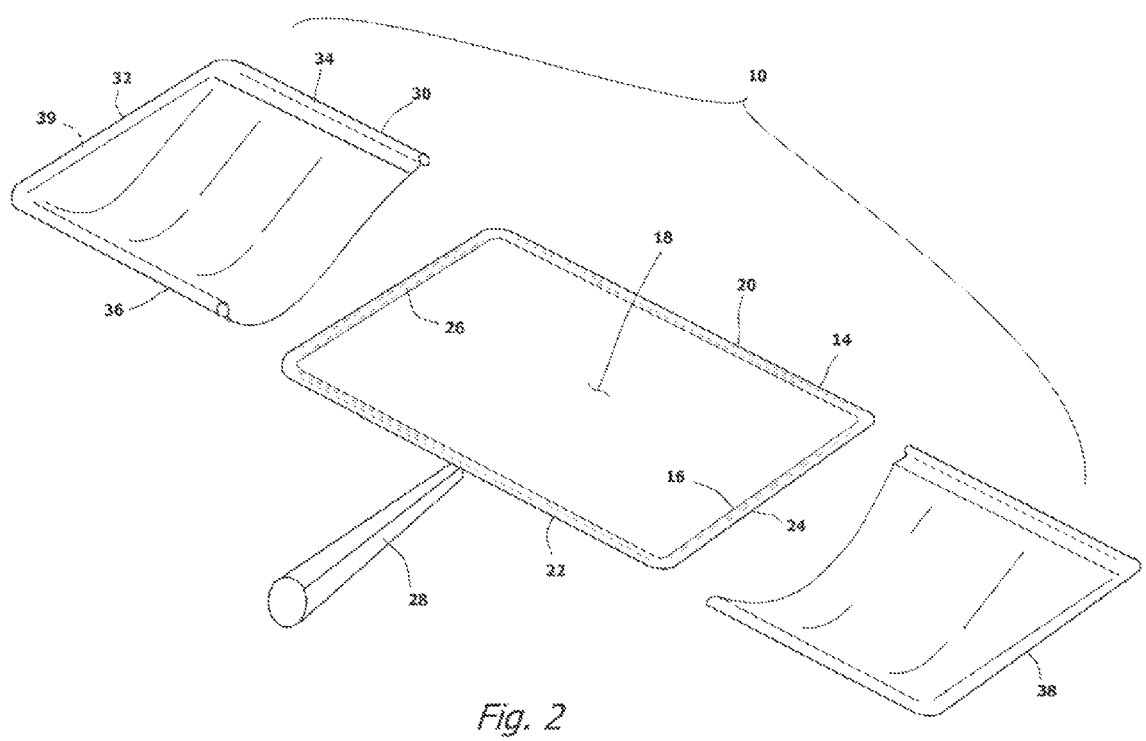
FIG. 2 is an exploded view of the exemplary embodiment of FIG. 1.

Referring to FIG. 1 in conjunction with FIG. 2, a hand fan 10 is shown. The hand fan 10 contains a blade configuration 12 in accordance with the present invention. Hand fans are manually operated with a waving motion. The waving motion causes the blade configuration 12 to move back and forth along an arcuate pathway. However, as will later be explained, the blade configuration can be attached to other air-moving or water-moving devices that can be either manually powered or machine powered.

The blade configuration 12 has a framework 14. The framework 14 is rigid, yet is capable of a small degree of flexing. The framework 14 is preferably made from molded plastic rods 16. However, metal rods can be used if additional strength is required. In the shown embodiment, the framework 14 creates a full peripheral frame around a defined area 18. The framework 14 contains a front frame element 20, a rear frame element 22 and two side frame elements 24, 26. All the frame elements 20, 22, 24, 26 are coplanar. The length of the front frame element 20 and the rear frame element 22 are longer than the length of the side frame elements 24, 26. As a result, the defined area 18 within the framework 14 is generally rectangular in shape, having a longer length than width.

The framework 14 extends in a single flat plane. Accordingly, the defined area 18 is planar. A handle 28 is attached to the rear frame element 22 for supporting the framework. The handle 28 need not extend in the same plane as the framework 14. The handle 28 is used to wave the framework 14 back and forth in the traditional manner of a hand fan.

The framework 14 supports a flexible panel 30 that extends over the defined area 18 of the framework 14. The flexible panel 30 is preferably impervious to air, if used to move air. Likewise the flexible panel 30 is preferably impervious to water, if used to move water. The preferred materials for the flexible panel 30 are plastic and Mylar® films. Although the flexible panel 30 is suspended across the planar framework 14, the flexible panel 30 is not planar. Rather, the flexible panel 30 has a complex shape.

The flexible panel 30 has a periphery 32 that attaches to the framework 14. The attachment is preferably achieved by passing the frame elements 20, 22, 24, 26 of the framework 14 through conduits that are sewn, or otherwise formed, into the periphery 32 of the flexible panel 30. The result is that the periphery 32 of the flexile panel 30 is coplanar with the framework 14. Within the periphery 32 of the flexible panel 30, the flexible panel 30 has a complex shape. The flexible panel 30 has a forward edge 34 that interconnects with the front frame element 20 of the framework 14. The flexible panel also has a rearward edge 36 that interconnects with the rear frame element 22 of the framework 14. Likewise, the flexible panel 30 has side edges 38, 39 that attach to the side frame elements 24, 26.

Figure 3:
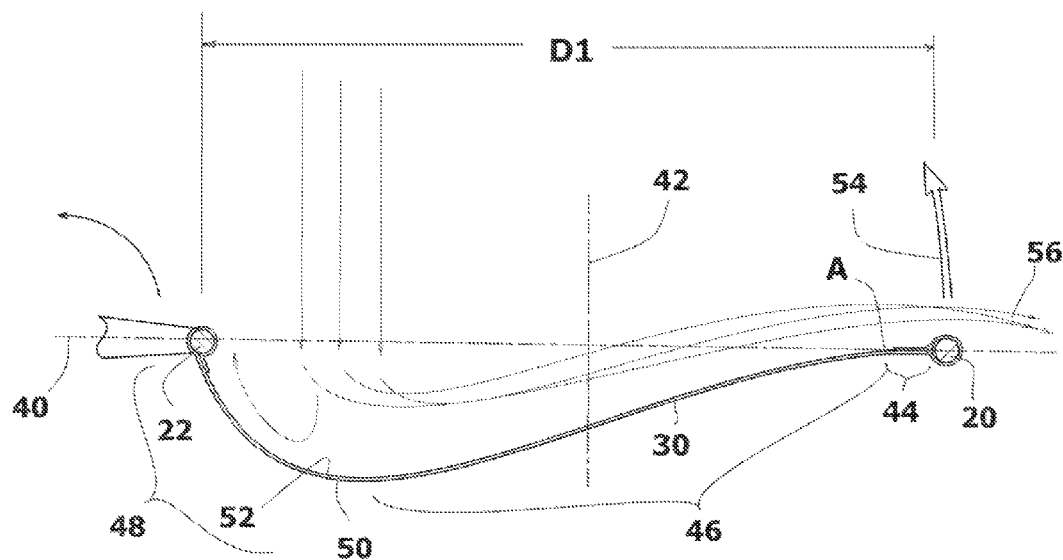
FIG. 3 is a cross-sectional view of the exemplary embodiment with the blade configuration moving in a first direction.

Referring to FIG. 3 in conjunction with FIG. 1 and FIG. 2, the framework 14 and the peripheral edges 34, 36, 38, 39 of the flexible panel 30 pass through a common plane 40. An imaginary vertical bisection line 42 is also shown halfway between the front frame element 20 and the rear frame element 22, wherein the imaginary bisection line 42 is perpendicular to the common plane 40. From FIG. 3, it can be seen that a slack pocket 50 is formed into the flexible panel 30. The presence of the slack pocket 50 causes areas of the flexible panel 30 to extend out of the common plane 40. The pocket 50 is invertible. That is, the pocket 50 can extend either above or below the common plane 40 depending upon what direction the flexible panel 30 is moved through a fluid.

The flexible panel 30 has three sections 44, 46, 48 of different characteristics. The first section is a taut section 44 that extends just behind the front frame element 20 of the framework 14. In the taut section 44, the flexible panel 30 is pulled taut within the framework 14 and the flexible panel 30 is therefore held in the common plane 40 in front of the pocket 50. The length of the taut section 44 is preferably between five percent and twenty percent of the overall distance D1 between the front frame element 20 and the rear frame element 22.

The second section of the flexible panel 30 is the descending section 46. In the descending section 46, the flexible panel 30 gradually increases in size. This causes the flexible panel 30 to sag and descend below the common plane 40 and into the trough 52 of the pocket 50. The descending section 46 extends from the interface with the taut section 44 at point A to the low point at the trough 52. The descending section 46 is bisected, or nearly bisected by the imaginary bisection line 42.

The third section is an ascending section 48. In the ascending section 48, the flexible panel 30 gradually decreases in size, therein causing the flexible panel 30 to become tauter as it ascends out of the trough 52 of the pocket 50. The flexible panel 30, therefore, becomes less slack as it ascends from the trough 52 to the rear frame element 22. The trough 52 is the interface between the descending section 46 and the ascending section 48. This creates the pocket 50 in the flexible panel 30. The low trough 52 of the pocket 50 is preferably between twenty percent and fifty percent as deep as the flexible panel 30 is wide. Because the pocket 50 is positioned closer to the rear frame element 22 than to the front frame element 20, the flexible panel 30 has a gradual average slope from the front frame element 20 to the trough 52 and a more abrupt average slope from the trough 52 to the rear frame element 22.

When the blade configuration 12 is moved laterally in the direction of arrow 54, the flexible panel 30 catches and displaces the incoming air. The incoming air fills the pocket 50. As air is displaced, the air attempts to flow around the moving blade configuration 12, the air flows mostly along the path of least resistance. In the shown design, the path of least resistance out of the pocket 50 is along the path with the mildest average slope, that is, the path from the trough 52 of the pocket 52 to the front frame element 20. As a result, more air is displaced toward the front frame element 20 of the flexible panel 30 than in any other direction. The result is a vector flow of air in the direction of arrow 56 as the blade configuration 12 moves in the direction of arrow 54.

Figure 4:
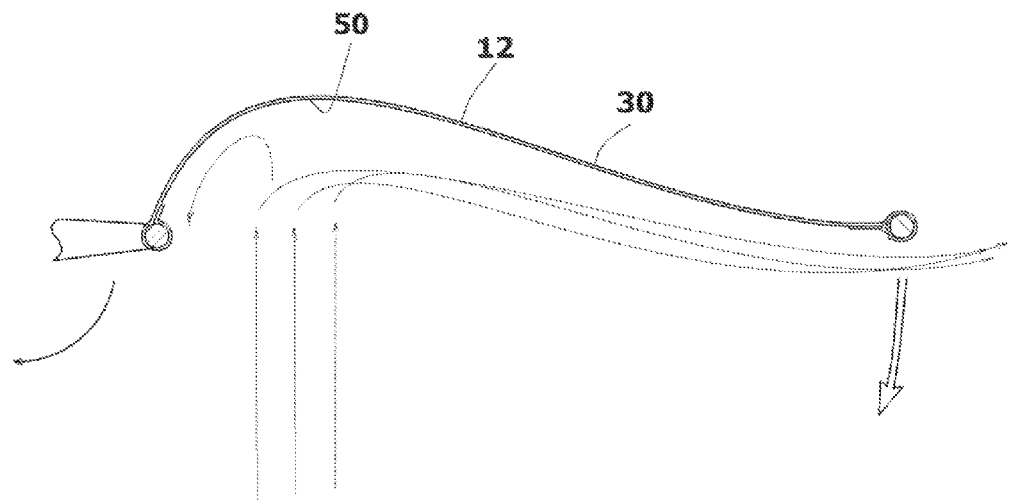
FIG. 4 is a cross-sectional view of the exemplary embodiment with the blade configuration moving in a second direction.

Referring to FIG. 4, it will be understood that when the blade configuration 12 is waved back and forth as a fan, the flexible panel 30 inverts. The trough 52 of the pocket 50 therein becomes the high apex of an inverted pocket, if the same point of reference is maintained. When the flexible panel 30 inverts, it forms a mirror image of its original configuration. The flexible panel 30 therefore affects air in the same manner, just moving in the opposite direction. The forward vector flow of air is maintained provided the blade configuration 12 is moving through air. The direction of movement for the blade configuration 12, be it up, down, left or right, is irrelevant.

From the above, it will be understood that when the blade configuration 12 is waved as a fan, it moves air in the traditional manner of a flat hand fan. However, in addition to the regular flow of air, the air flow is supplemented by the vector flow of air. The fan 10 therefore moves more air forward in the direction of arrow 56 during each stroke of the fan. This makes the fan 10 both more efficient and more effective.

Figure 5:
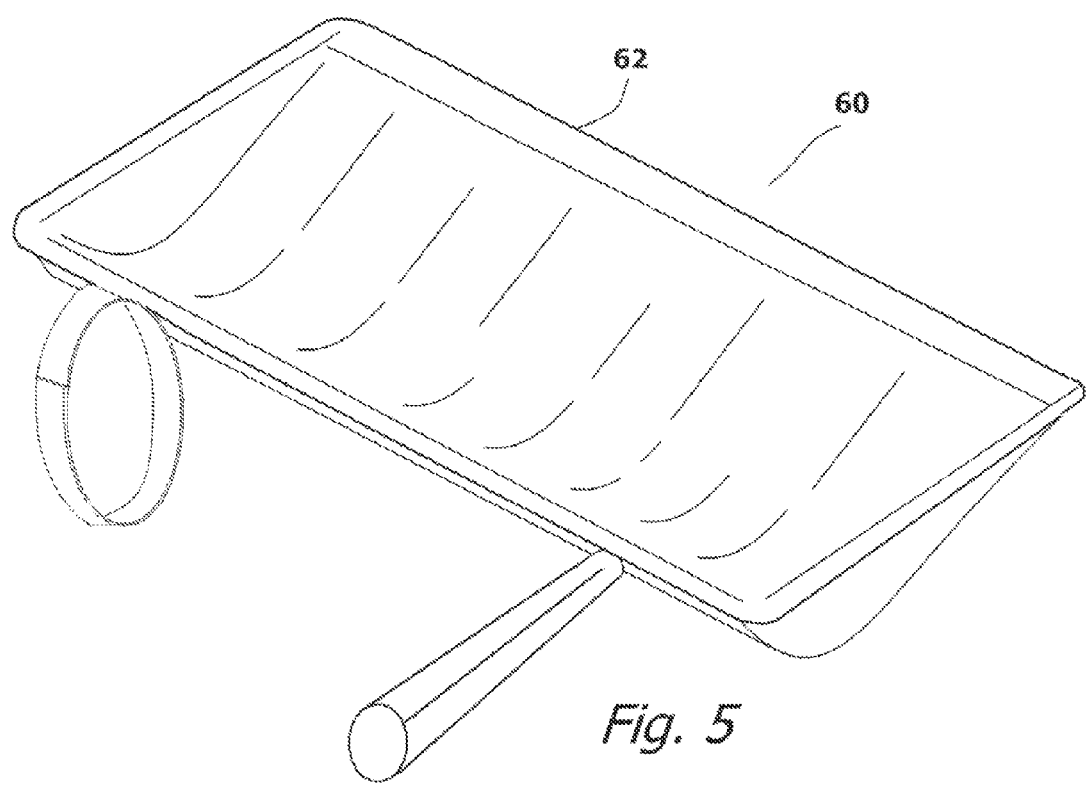
FIG. 5 is a perspective view of an alternate exemplary embodiment of a fan containing a blade configuration in accordance with the present invention.
Figure 6:
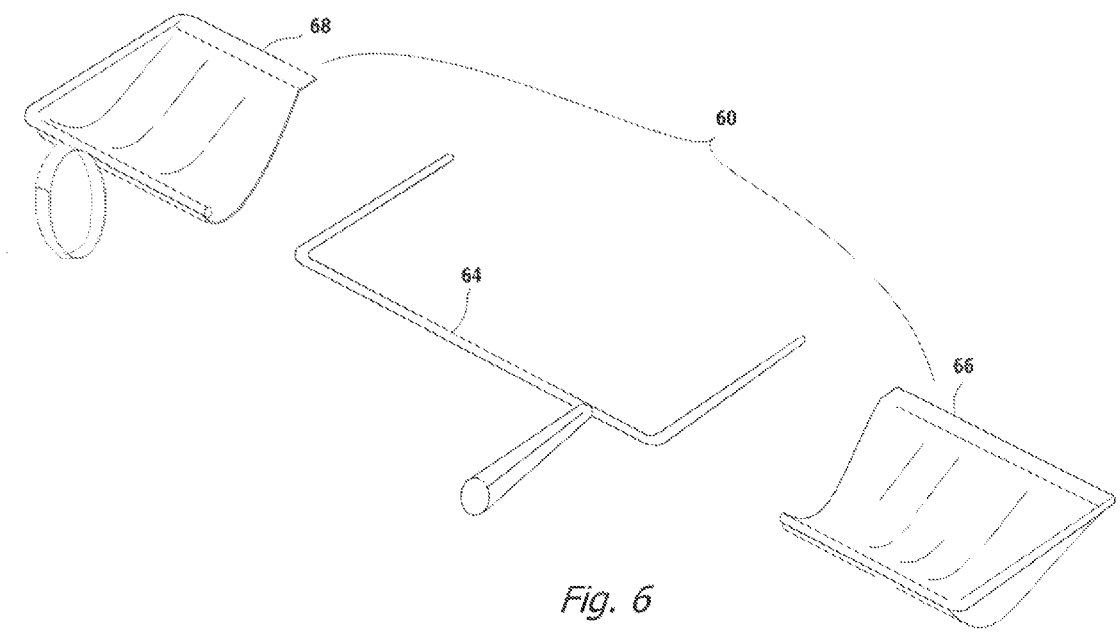
FIG. 6 is an exploded view of the exemplary embodiment of FIG. 5.

Referring to FIG. 5 and FIG. 6, an alternate embodiment of the blade configuration 62 is shown on an arm paddle 60. The arm paddle 60 can be used by a person of a surfboard, inner tube or similar floatation device, wherein the arm paddle 60 is waved in the water to create propulsion. In this embodiment, a generally U-shaped framework 64 is provided that has no front frame element. A flexible panel 66 is provided that is suspended within the framework 64. The flexible panel 66 has a front edge 68 that is taut across the framework 64. Since the flexible panel 66 is kept taut at its front edge 68, no forward frame element is needed in support. Rather, it is sufficient to reinforce the front edge 68 of the flexible panel 66 with a folded hem, so that it will not tear. The blade configuration 62 otherwise operates in the same manner and has the same benefits as those previously described.

Figure 7:
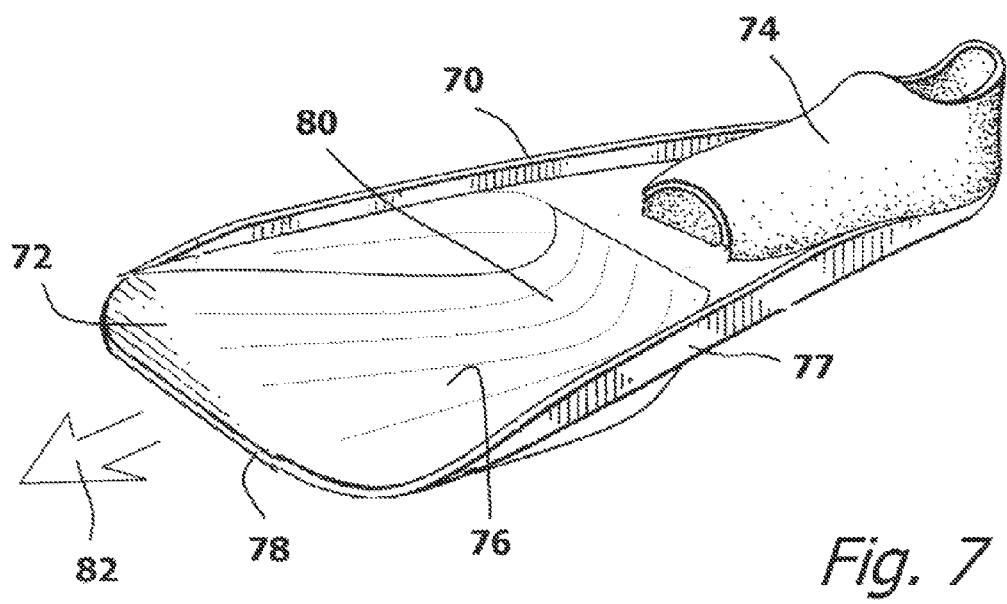
FIG. 7 is a perspective view of an alternate exemplary embodiment of a flipper containing a blade configuration in accordance with the present invention.

Referring to FIG. 7, a blade configuration 72 is built into a swimming flipper 70. The flipper 70 has a compartment 74 for holding a swimmer's foot. A flexible panel 76 extends forward of the foot compartment 74. The flexible panel 76 is suspended within a semi-rigid framework 77. The flexible panel 76 has the same type of pocket 80 as has been previously described. The flexible panel 76 slopes gradually from the front edge 78 of the flexible panel 76 to the trough of the pocket 80. Conversely, the flexible panel 76 has a steep slope from the bottom of the pocket 80 to the front of the shoe compartment 74. The result is that the flexible panel 76 will produces a forward vector flow of fluid in the direction of arrow 82 as the flipper 70 is moved through the water. This increases the amount of water moved in a useful direction by the flipper 70 in each stroke. Thus, the flipper 70 is made more efficient and more effective.

It will be understood that the embodiments of the present invention that are illustrated and described are merely exemplary and that a person skilled in the art can make many variations to those embodiments. For instance, the present invention can be used on any fluid moving system with blades that move in a waving motion. All such embodiments are intended to be included within the scope of the present invention as defined by the claims.

What is claimed is:

1. A blade configuration for use in moving a fluid using a waving action, said blade configuration comprising:
   a flexible panel that is generally impervious to said fluid, said flexible panel having a periphery that includes a front edge and a rear edge, wherein said flexible panel has a first section proximate said front edge and an invertible pocket depression disposed between said first section and said second edge;
   a framework that supports said periphery of said flexible panel in a common plane, wherein said framework holds said first section of said flexible panel taut in tension in said common plane, and wherein said pocket depression protrudes out of said common plane;
   wherein said flexible panel has a first average slope from said first section to said pocket depression and a second average slope from said rear edge to said pocket depression, wherein said second average slope is greater than said first average slope.

2. The blade configuration according to claim 1, wherein said second average slope is at least twice as steep as said first average slope.

3. The blade configuration according to claim 1, wherein said periphery of said flexible panel is generally rectangular in shape, having two long sides and two short sides, wherein said front edge and said rear edge are said long sides.

4. The blade configuration according to claim 3, wherein said flexible panel has a first width that extends from said front edge to said rear edge, wherein said first section has a second width that is between five percent and twenty percent of said first width of said flexible panel.

5. The blade configuration according to claim 1, wherein said framework has frame elements that run along all of said periphery of said flexible panel, therein holding all of said periphery in said common plane.

6. The blade configuration according to claim 1, wherein said framework has frame elements that support said flexible panel along all of said periphery except said front edge.

7. The blade configuration according to claim 1, wherein said pocket depression has a deepest point that extends a first distance from said common plane, wherein said first distance is between five percent and fifty percent of said first width of said flexible panel.

8. A hand fan assembly, comprising
   a handle;
   a framework supported by said handle, said framework having a rear frame element and two side frame elements that extend from said rear frame element;
   a flexible panel of air-impervious material suspended within said framework between said rear frame element and said two side frame elements, said flexible panel having a front edge, a rear edge and two side edges, wherein said rear edge, and said two side edges are supported by said framework in a common plane, and said framework holds said first edge of said flexible panel taut in tension in said common plane, and
   an invertible pocket depression formed within said flexible panel that protrudes out of said common plane, wherein said invertible pocket depression has a deepest point that protrudes furthest from said common plane;
   wherein said pocket depression is positioned equidistant between said side edges, and said deepest point is closer to said rear edge than said front edge.

9. The assembly according to claim 8, wherein said flexible panel has a first average slope from said front edge to said deepest point of said pocket depression and a second average slope from said rear edge to said deepest point of said pocket depression, wherein said second average slope is greater than said first average slope.

10. The assembly according to claim 9, wherein said second average slope is at least twice as steep as said first average slope.

11. The assembly according to claim 9, wherein said periphery of said flexible panel is generally rectangular in shape, having two long sides and two short sides, wherein said front edge and said rear edge are said two long sides.

12. The assembly according to claim 11, wherein said flexible panel has a first width that extends from said front edge to said rear edge, wherein said first section has a second width that is between five percent and twenty percent of said first width of said flexible panel.

13. The assembly according to claim 8, wherein said framework has frame elements that run along said front edge, said rear edge and said two side edges, therein holding said front edge, said rear edge and said two side edges in said common plane.

14. The assembly according to claim 8, wherein said framework has frame elements that support said flexible panel along all rear edge and said two side edges but not along said front edge.

15. The assembly according to claim 12, wherein said deepest point of said pocket depression extends a first distance from said common plane, wherein said first distance is between five percent and fifty percent of said first width of said flexible panel.

16. A blade configuration for use in moving a fluid using a waving action, said blade configuration comprising:
   a flexible panel that is generally impervious to said fluid, said flexible panel having a periphery that includes a front edge and a rear edge, wherein said flexible panel has a first width between said front edge and said rear edge and an invertible pocket depression disposed between said front edge and said rear edge; and a framework that supports said periphery of said flexible panel in a common plane, wherein said pocket depression has a deepest point that protrudes a first distance from said common plane, wherein said first distance is between five percent and fifty percent of said first width of said flexible panel;

wherein said flexible panel has a first average slope from said front edge to said deepest point of said pocket depression and a second average slope from said rear edge to said deepest point of said pocket depression, wherein said second average slope is greater than said first average slope.

* * * * *